UNITED STATES PATENT OFFICE.

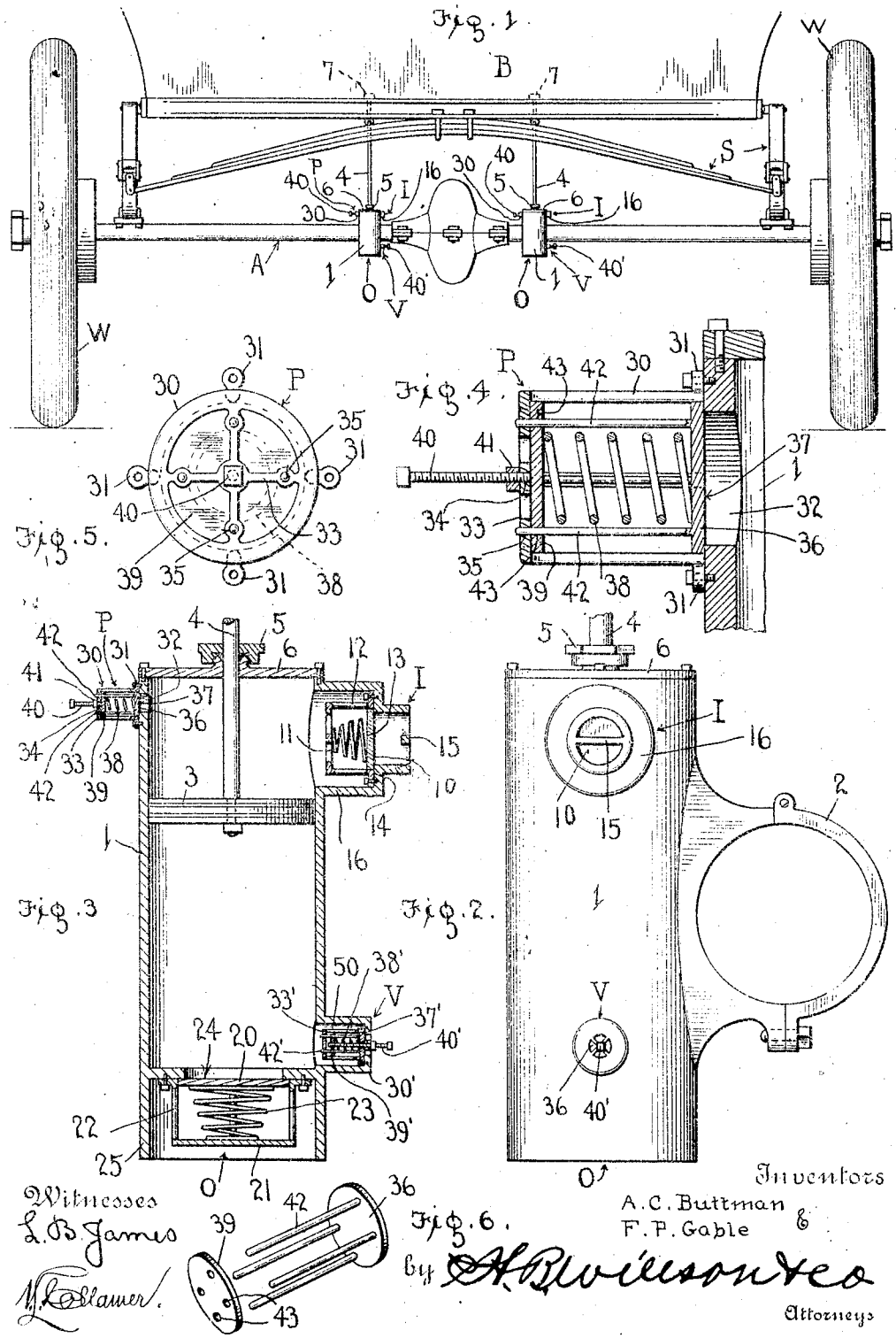

ALONZO C. BUTTMAN AND FRANKLIN P. GABLE, OF GRANDVIEW, IOWA.

RECOIL-NEUTRALIZER.

1,017,953.   Specification of Letters Patent.   Patented Feb. 20, 1912.

Application filed October 5, 1911. Serial No. 652,969.

*To all whom it may concern:*

Be it known that we, ALONZO C. BUTTMAN and FRANKLIN P. GABLE, citizens of the United States, residing at Grandview, in the county of Louisa and State of Iowa, have invented certain new and useful Improvements in Recoil-Neutralizers; and we do declare the following to be a full, clear, and exact description of the invention, such as will enable others skilled in the art to which it appertains to make and use the same.

This invention relates to vehicles, and more especially to the springs thereof; and the object of the same is to produce a device for neutralizing or overcoming the recoil or rebound of a spring after it has been compressed.

It is well known that on vehicles of all kinds, and especially on automobiles, the springs are designed with proportionate reference to the average roughness of the road and speed of driving, the known weight of the body and superstructure, and the average additional weight of the load, but as some of these conditions are changeable and as the tension of the leaves in the springs is constantly changing it is impossible to support an automobile body on its running gear by any kind of springs whose action will be the same under all conditions and at all times. It is also well known to those familiar with the art that when a vehicle spring is broken it occurs almost invariably on the recoil or rebound after the spring has been compressed. Shock-absorbers have been devised to deaden or retard compression, and efforts have also been made to deaden or retard the recoil; but as explained above the conditions are variable, changeable, and uncertain, and a neutralizer which would offset or retard the recoil at one time would not be successful at another.

It is therefore the purpose of the present invention to produce a spring recoil neutralizer which will impede the compression of the spring practically not at all, will retard its recoil to a large extent, and will possess adjustable relief valves whereby its action may be quickly controlled by adjustments capable of being set by hand at any time so as to accommodate the device to the conditions existing. This object is carried out by the construction hereinafter more fully described and claimed, and as shown in the drawings wherein—

Figure 1 is a rear elevation of an automobile equipped with our device; Fig. 2 is a side elevation and Fig. 3 a central vertical sectional view of the neutralizer on an enlarged scale; Fig. 4 is a central longitudinal section and Fig. 5 an outer end view of one of the relief valves on a still larger scale; Fig. 6 is a perspective detail showing the guiding means for the relief valve.

In the present embodiment of our invention we have shown it as applied to the rear axle A of an automobile whose body B is supported therefrom by any suitable type of springs S, those shown therein having leaves as is common in semi-elliptical automobile springs. When one or both of the wheels W pass over an obstruction the spring is compressed, the axle rises considerably, the body rises a little and the jolt is not felt by the passengers; but as soon as the obstruction has been passed the wheel and axle descend, the spring resumes its former position whereas the body has meanwhile been elevated a little, this action of the spring therefore decreases its supporting power a little just at the time when the elevation of the body requires that it should be increased, and the result is that the body then forcibly and quickly descends toward the axle occasioning what is called the "rebound" of the spring which throws greater strain upon it than the bump that occurred when the wheel passed over the obstruction. It is on this rebound that so many springs are broken, and it is the purpose of our invention to neutralize the same. But as above explained, the road to be traveled may vary in its roughness at different times or according to the nature of its surface, the speed of travel is rarely twice the same, and the load carried is different on different occasions; and it is the purpose of our invention particularly to provide a recoil neutralizer having means for permitting ready adjustment to suit these conditions.

Coming now more particularly to the present invention, the numeral 1 designates an upright cylinder here shown as having a clamp 2 by which it is secured to the axle A, 3 is a piston within said cylinder, and 4 is a rod moving through a stuffing box 5 in the head 6 of the cylinder and connected as at 7 with the body B as shown. The normal position of the piston within the cylinder is best indicated in Fig. 3, and it will be obvious that when the spring is compressed the piston will descend whereas if the wheel should drop into a hole and the spring should open yet a little more than normal the piston might yet rise a little within the cylinder. Above the normal position of said piston is an inlet valve I, and below said normal position is an outlet valve O, the specific construction of these valves being unimportant although by preference it is as follows. The inlet valve has a head 10 pressed normally outward against its seat 14 by a spring 13 interposed between the valve and a spider 11 at the inner end of a cage 12. The outlet valve O is disposed in exactly the opposite position, but may yet be of like construction. That is to say, its valve head 20 is pressed normally inward against the seat 24 by a spring 23 whose outer end rests against a spider 21 carried by a cage 22. If the outlet valve is disposed in the lower end of the cylinder 1 as shown it may be well to carry it downward somewhat as at 25 so as to surround the cage 22 and protect the same from injury; but by preference the inlet valve is located in an offset 16 from the side of the cylinder 1 at the upper end of the latter as shown in Fig. 3 and protected by a cross bar 15. With this construction, when an obstruction in the roadway is struck and the axle rises, the cylinder 1 moves upward while the piston 3 remains stationary, and relatively it descends with respect to the body of the cylinder so that the air therein is driven out the outlet valve whose head 20 is unseated by the compression occurring. Simultaneously the partial vacuum created above the piston will suck air inward through the cage 12 of the inlet valve I, which cage is of sufficient size to admit the air freely. On the rebound, or when the piston begins to move upward with respect to the cylinder, the outlet valve closes immediately so that a vacuum is formed beneath the piston and the sudden and dangerous recoil of the spring is prevented; and if by any chance the outlet valve should not close sufficiently soon, the quick upward movement of the piston creates pressure above it and the inlet valve will be closed against its seat so that the air trapped in the upper end of the cylinder will form a cushion to prevent said recoil.

If the parts above described were accurately constructed and fitted, the leakage past the piston or through the outlet valve when closed would be so little that after the spring had been compressed it would open again with extreme deliberation, and we have therefore provided relief valves in the cylinder at both sides of the piston, the vacuum relief valve being lettered V and located adjacent the outlet valve O, and the pressure relief valve being lettered P and located adjacent the inlet valve I. As these valves are of almost identical construction, we have illustrated only the pressure valve P in Figs. 4, 5 and 6.

The numeral 30 designates the valve cage having ears 31 around its inner end by which it is secured to the side of the cylinder 1 over an opening 32 therein, and having a spider 33 in its outer end pierced with a central threaded hole 34 and with a smooth eye 35 in each arm of the spider.

The numeral 36 designates the valve head which is closed normally against a seat 37 around said opening 32 by an expansive spring 38 whose inner end bears against the back of the head and whose outer end bears against a plate 39 which fits slidably within the cage 30. 40 designates a screw taking through the threaded hole 34 against the outer side of said plate so that the position of the latter and the tension of the spring may be adjusted, and 41 is a jam nut on a screw for holding the same against movement after it has been set.

In order that the valve head 36 may not stick within the cage, it is provided with a series of pins 42 projecting outward from it and standing parallel with each other, and these pins pass through eyes 43 in the plate 39 and then through the eyes 35 in the spider 33. The construction of the vacuum relief valve V is very similar excepting that its parts are reversed. That is to say, the seat 37' is at the outer end of a casing 30' the spring 38' is coiled around the screw 40' and both are within the pins 42', the spider 33' is carried at the inner end of an open cage 50, the plate 39' stands between said spider and the valve head, and the adjustment of the screw compresses the spring from its inner instead of its outer end. Otherwise the construction of this valve is very similar to that of the valve above described, save that its head opens inwardly off its seat instead of outwardly. The addition of these relief valves to the device above described produces the following result, when the tension of their springs is properly adjusted: When the piston has descended within the cylinder and blown out the air therein beneath said piston and the latter begins to ascend, the outlet valve O closes, the vacuum produced is slowly relieved by the opening of the vacuum relief valve V. Simultaneously the pressure set up above said piston at this time (the inlet valve I being closed) is also slowly relieved by the pressure relief valve P. The independent means of adjusting these two relief valves permits the user to accommodate this improved recoil neutralizer to the various conditions under which it will be used, and in doing so he may adjust the tension of one spring or the other, or both. Assuming that he adjusts both screws 40 and 40' so that the two relief valve heads are held against their seats by extremely weak pressure of the two springs; as soon as the spring S has been compressed and the piston 3 starts to reascend within the cylinder, the weak springs 38 and 38' will yield and air will be admitted below the piston and permitted to flow out above it so that it may rise rapidly and the parts will resume their normal position quickly. On the other hand, assuming that both screws 40 and 40' are set up so that the springs 38 and 38' are under considerable tension and the valves 36 and 36' are held quite forcibly against their seats; then when the piston 3 begins to reascend its movement will be checked, retarded, or rendered quite deliberate by reason of the fact that a considerable vacuum must be set up below it before the relief vacuum valve opens and a considerable pressure must be created above it before the relief pressure valve opens. Between these two extremes, he may of course adjust one valve tight and leave the other adjusted loose, thereby putting one spring 38 under tension and leaving the other to exert weak pressure upon its valve head. But in any event it is our intention that the openings through the relief valves shall be much smaller than those through the main inlet and outlet valves so that, even when the relief springs are extremely weak, the leakage of air through the relief valves will be relatively small as compared with the volume of air above and below the piston 3. It will be seen that the gist of our invention, however, lies in the fact that we provide means for adjusting the tension of the relief springs so that the time at which the relief valves may open will be regulated to accommodate this neutralizer to various conditions under which it is to be used.

The precise details of construction may be varied considerably without departing from the spirit of our invention.

What is claimed as new is:

1. In a recoil neutralizer, the combination with a cylinder connected with one member, a piston therein, a piston rod connected with the piston and extending through the cylinder head and connected with another member, and a spring connecting said members and whose recoil is to be neutralized; of an inlet valve opening inwardly into the cylinder at one side of the piston, an outlet valve opening outwardly from the cylinder at the other side of the piston, relief valves of smaller capacity than said inlet and outlet valves and located adjacent thereto, that near the inlet valve opening outward from the cylinder and that near the outlet valve opening inward toward the same, and independent means for permitting the adjustment of said relief valves.

2. In a recoil neutralizer, the combination with a cylinder connected with one member, a piston therein, a piston rod connected with the piston and extending through the cylinder head and connected with another member, and a spring connecting said members and whose recoil is to be neutralized; of an inlet valve opening inwardly into the cylinder at one side of the piston, an outlet valve opening outwardly from the cylinder at the other side of the piston, a spring holding the inlet valve normally closed, a spring holding the outlet valve normally closed, a relief valve near the inlet valve opening outward from the cylinder and a relief valve near the outlet valve opening inward toward the same, springs holding said relief valves normally closed, and screws for independently adjusting the tension of said springs.

3. In a recoil neutralizer, the combination with a cylinder connected with one member, a piston therein, a piston rod connected with the piston and extending through the cylinder head and connected with another member, and a spring connecting said members and whose recoil is to be neutralized; of an inlet valve opening inwardly into the cylinder at one side of the piston, an outlet valve opening outwardly from the cylinder at the other side of the piston, relief valves of smaller capacity than said inlet and outlet valves and located respectively adjacent thereto, that near the inlet valve opening outward from the cylinder and that near the outlet valve opening inward toward the same, springs holding said relief valves normally closed, and screws for independently adjusting the tension of said springs.

4. In a recoil neutralizer, the combination with a cylinder connected with one member, a piston therein, a piston rod connected with the piston and extending through the cylinder head and connected with another member, and a spring connecting said members and whose recoil is to be neutralized; of an inlet valve opening inwardly into the cylinder at one side of the piston, an outlet valve opening outwardly from the cylinder at the other side of the piston, a spring holding the outlet valve normally closed, a relief valve of smaller capacity than the outlet valve and located adjacent thereto and opening inwardly into the cylinder, a spring therefor of less power than that controlling the outlet valve, a tension plate for controlling the tension of this spring, and a screw for permitting the manual adjustment of said plate.

5. In a recoil neutralizer, the combination with a cylinder connected with one member, a piston therein, a piston rod connected with the piston and extending through the cylinder head and connected with another member, and a spring connecting said members and whose recoil is to be neutralized; of an inlet valve opening inwardly into the cylinder at one side of the piston, a spring holding the inlet valve normally closed, an outlet valve opening outwardly from the cylinder at the other side of the piston, a relief valve adjacent the inlet valve and opening outward from the cylinder, its capacity being less than that of said inlet valve, a relatively weak spring holding this valve normally closed, and manually operable means for adjusting the tension of said spring.

In testimony whereof we have hereunto set our hands in presence of two subscribing witnesses.

ALONZO C. BUTTMAN.
FRANKLIN P. GABLE.

Witnesses:
T. B. CHRISTY,
DANIEL ANTHONY.